US012703064B2

(12) United States Patent
Renaud et al.

(10) Patent No.: US 12,703,064 B2
(45) Date of Patent: Aug. 11, 2026

(54) ABRASIVE FLOW MACHINING PROCESS FOR A MERIDIONALLY DIVIDED TURBINE HOUSING, AND A MASKING FIXTURE USED IN SAID PROCESS

(71) Applicant: Garrett Transportation I Inc., Torrance, CA (US)

(72) Inventors: Philippe Renaud, Thaon-les-Vosges (FR); Sudhir Bangaru, Bangalore (IN)

(73) Assignee: GARRETT TRANSPORTATION I INC., Torrance, CA (US)

( * ) Notice: Subject to any disclaimer, the term of this patent is extended or adjusted under 35 U.S.C. 154(b) by 457 days.

(21) Appl. No.: 17/805,030

(22) Filed: Jun. 2, 2022

(65) Prior Publication Data

US 2023/0390896 A1 Dec. 7, 2023

(51) Int. Cl.

| | |
|---|---|
| ***B24C 3/32*** | (2006.01) |
| ***B24B 57/02*** | (2006.01) |
| ***B24B 57/04*** | (2006.01) |
| ***B24C 1/04*** | (2006.01) |
| ***B24C 1/08*** | (2006.01) |
| ***B24C 7/00*** | (2006.01) |
| ***F01D 9/02*** | (2006.01) |
| ***F01D 25/24*** | (2006.01) |

(52) U.S. Cl.

CPC .............. *B24C 3/325* (2013.01); *B24B 57/02* (2013.01); *B24B 57/04* (2013.01); *B24C 1/045* (2013.01); *B24C 1/08* (2013.01); *B24C 7/0053* (2013.01); *F01D 9/026* (2013.01); *F01D 25/24* (2013.01); *F05D 2220/40* (2013.01); *F05D 2230/10* (2013.01); *F05D 2240/128* (2013.01)

(58) Field of Classification Search

CPC .. B24C 1/045; B24C 1/04; B24C 1/08; B24C 3/325; B24C 3/32; B24C 7/0053; B24C 7/00; B24C 3/327; B24B 57/04; B24B 31/116; B24B 31/006; B24B 31/00; B24B 57/02; B24B 57/00; F01D 9/026; F01D 9/02; F01D 25/24; F05D 2220/40; F05D 2230/10; F05D 2240/128

See application file for complete search history.

(56) References Cited

U.S. PATENT DOCUMENTS

| | | | | | |
|---|---|---|---|---|---|
| 4,936,057 | A * | 6/1990 | Rhoades | B24B 31/116 | 451/36 |
| 9,828,913 | B2 * | 11/2017 | Sloss | F01D 9/026 | |
| 10,519,850 | B2 * | 12/2019 | Yokoyama | F02B 39/00 | |
| 2014/0219836 | A1 * | 8/2014 | Houst | F02C 3/28 | 417/406 |
| 2017/0368665 | A1 * | 12/2017 | Feick | B24C 5/00 | |
| 2018/0250791 | A1 * | 9/2018 | Rao | B24B 31/116 | |

* cited by examiner

*Primary Examiner* — Monica S Carter
*Assistant Examiner* — Kent N Shum
(74) *Attorney, Agent, or Firm* — BelayIP

(57) ABSTRACT

An abrasive flow machining process for a meridionally divided turbine housing for a turbocharger employs a fixture installed in the axial bore of the housing to force the abrasive medium to flow substantially 360° about the circumference of the volute, and to shield the portion of the divider of the turbine housing volute located proximate the turbine housing inlet.

17 Claims, 7 Drawing Sheets

ABRASIVE FLOW MACHINING PROCESS FOR A MERIDIONALLY DIVIDED TURBINE HOUSING, AND A MASKING FIXTURE USED IN SAID PROCESS

BACKGROUND OF THE INVENTION

The present disclosure relates to turbochargers in which a turbine of the turbocharger is driven by exhaust gas from an internal combustion engine (ICE). The invention relates more particularly to turbine housings defining a twin scroll in which a divider partitions an annular volute into two meridionally divided scrolls each fed by a separate exhaust system from the ICE.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically, the turbine housing is formed separately from the compressor housing, and there is yet another center housing connected between the turbine and compressor housings for containing bearings for the shaft. The turbine housing defines a generally annular volute that surrounds the turbine wheel and that receives exhaust gas from an engine. The turbine assembly includes a nozzle that leads from the volute into the turbine wheel. The exhaust gas flows from the volute through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

In multiple-piston reciprocating engines, it is known to design the exhaust system in such a manner as to take advantage of the pressure pulsation that occurs in the exhaust stream. In particular, it is known to employ what is known as "pulse separation" wherein the cylinders of the engine are divided into a plurality of subgroups, and the pulses from each subgroup of cylinders are substantially isolated from those of the other subgroups by having independent exhaust passages for each subgroup. To take best advantage of pulse separation, it is desired to minimize the communication or "cross talk" between the separate groups of cylinders. Accordingly, in the case of a turbocharged engine, it is advantageous to maintain separate exhaust passages all the way into the turbine of the turbocharger. Thus, the turbine housing into which the exhaust gases are fed is typically divided into a plurality of substantially separate parts.

In a meridionally divided turbine housing, the scroll or volute that surrounds the turbine wheel and receives the exhaust gases is divided into a plurality of passages in the meridional plane such that each passage occupies substantially a full circumference and the passages succeed each other in the axial direction.

The present disclosure particularly concerns processes for reducing the surface roughness of internal surfaces of a meridionally divided turbine housing. Surface friction losses on the internal wetted surfaces of the turbine housing volute have a significant impact on aerodynamic performance of the turbine. Turbine housings are generally cast in sand molds, and are used as-cast, without any post-processing to improve the surface finish. This is not ideal, however, because the as-cast surface roughness achieved in sand casting is typically about Ra 25 (average roughness of 980 μin). The application of mold coatings can reduce this value somewhat, but generally it still is not possible to achieve a level of roughness that would significantly reduce friction losses.

There are known processes for polishing or honing internal surfaces of parts. Abrasive flow machining (AFM), also known as extrude honing, entails pressurizing a thick abrasive fluid or paste and causing it to flow through the internal chamber or passage of a part to smooth the inner surfaces of the chamber. There remain needs in the art of AFM processes as applied to meridionally divided turbine housings.

SUMMARY OF THE DISCLOSURE

The present disclosure relates to AFM processes and fixtures used therein, for treating the inner surfaces of a meridionally divided turbine housing. The turbine housing comprises an inlet pipe partitioned by a center wall into a first inlet conduit and a second inlet conduit for conducting two separate fluid streams into the turbine housing. A volute connected to the inlet pipe extends from the inlet pipe circumferentially about a center axis of the turbine housing, and an annular nozzle passage connects to the volute and extends radially inwardly therefrom with respect to the center axis. The turbine housing includes an axial bore connected to the nozzle passage and extending axially to a discharge opening, and further includes a divider disposed within the volute so as to divide the volute into a first scroll and a second scroll, the first scroll being connected to the first inlet conduit and the second scroll being connected to the second inlet conduit. In accordance with an embodiment of the invention, an abrasive flow machining process comprises the steps of:

- causing a medium comprising a pressurized abrasive fluid to flow in one direction between the inlet pipe and the discharge opening via the nozzle disposed therebetween;
- blocking flow of the medium through the nozzle in a first angular sector that extends partially about a circumference of the turbine housing, the first angular sector being adjacent the inlet pipe; and
- throttling flow of the medium through the nozzle in a second angular sector that begins at a point adjacent the first angular sector and extends about a remainder of the circumference,
- wherein the throttling step comprises variably throttling the flow of the medium within the second angular sector such that the flow is restricted to a greater degree in a first portion of the second angular sector and is restricted to a lesser degree in a second portion of the second angular sector In one embodiment, the first portion of the second angular sector is adjacent the first angular sector. The first angular sector suitably can occupy between 30° and 60° of the circumference.

The throttling step can comprise gradually reducing the degree of flow restriction within the first portion of the second angular sector with increasing circumferential distance from the first angular sector. Additionally or alternatively, throttling of the flow within the second portion of the second angular sector can be uniform over the second portion.

The blocking and throttling steps advantageously can be accomplished by a fixture installed in the axial bore of the turbine housing. The fixture regulates the flow of abrasive medium through the nozzle of the turbine.

A fixture in accordance with one embodiment of the invention comprises:

- a tubular side wall and an end wall joined to one end thereof to form a cup comprising a closed end and an open end; and
- a mounting flange disposed at the open end of the cup, the mounting flange extending radially outwardly with respect to a longitudinal axis of the cup;
- wherein the tubular side wall defines a first slot and a second slot each extending from a radially outer surface to a radially inner surface of the tubular side wall, the first and second slots being proximate the end wall and being axially spaced apart, the first and second slots being circumferentially coextensive and extending circumferentially over an angular sector occupying between 300° and 330° of a circumference of the tubular side wall such that there remains a slot-free blocking area occupying between 30° and 60° of the circumference.

In some embodiments, the first slot has a first axial slot width and the second slot has a second axial slot width, each of the first and second axial slot widths being non-uniform over said angular sector. In accordance with a particular embodiment, each of the first axial slot width and the second axial slot width progressively widens from a first circumferential location adjacent one circumferential side of the blocking area to a second circumferential location circumferentially spaced from the blocking area.

From the second circumferential location to a third circumferential location adjacent an opposite circumferential side of the blocking area, the first axial slot width can be substantially constant with changing circumferential location and the second axial slot width similarly can be substantially constant.

Processes and fixtures in accordance with embodiments of the invention can mitigate problems during AFM treatments of meridionally divided turbine housings, as further detailed below.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

As noted above, AFM treatment of meridionally divided turbine housings for turbochargers is prone to certain problems, among which is the excessive erosion of the radially inner edge of the divider that divides the turbine volute into two separate scrolls. The divider is already a rather thin-walled member even before AFM processing, but it has been found that the AFM process can erode the divider until it becomes razor-thin at its radially inner edge. This presents a number of unacceptable risks: the razor-thin edge is a safety risk for workers handling the turbine housing, and the resulting weakening of the divider increases the risk of failure of the divider, which can lead to turbine wheel damage if pieces of the divider were to come loose and enter the wheel.

Accordingly, the inventors set out to mitigate the problem. Extensive trials were conducted in which different media, different process characteristics, and various masking technologies were tested, with no success.

In the course of the investigation, it was noted that divider erosion was particularly evident on the portion of the divider nearest the turbine housing inlet pipe, while erosion was less-pronounced at locations circumferentially far-removed from the inlet. The inventors of the present invention determined that non-uniform flow of the abrasive medium about the circumference of the turbine volute appeared to be a primary cause of this non-uniform wear. The inventors therefore began to seek a solution that would force the abrasive medium to flow more-uniformly about the volute via the use of some type of fixture. Computational fluid dynamics (CFD) modeling of the turbine housing with various fixture designs was undertaken to gain an understanding of the fluid dynamics involved, which led to the design of the fixture of the present invention. The fixture is mounted within the axial bore of the turbine housing, and during the AFM process it serves to regulate the flow of the abrasive medium throughout the volute. More specifically, the fixture defines slots for allowing the abrasive medium to pass through the nozzle into the axial bore, and the slots are configured to variably throttle the flow of medium depending on circumferential position around the circumference of the volute.

Figure 1:
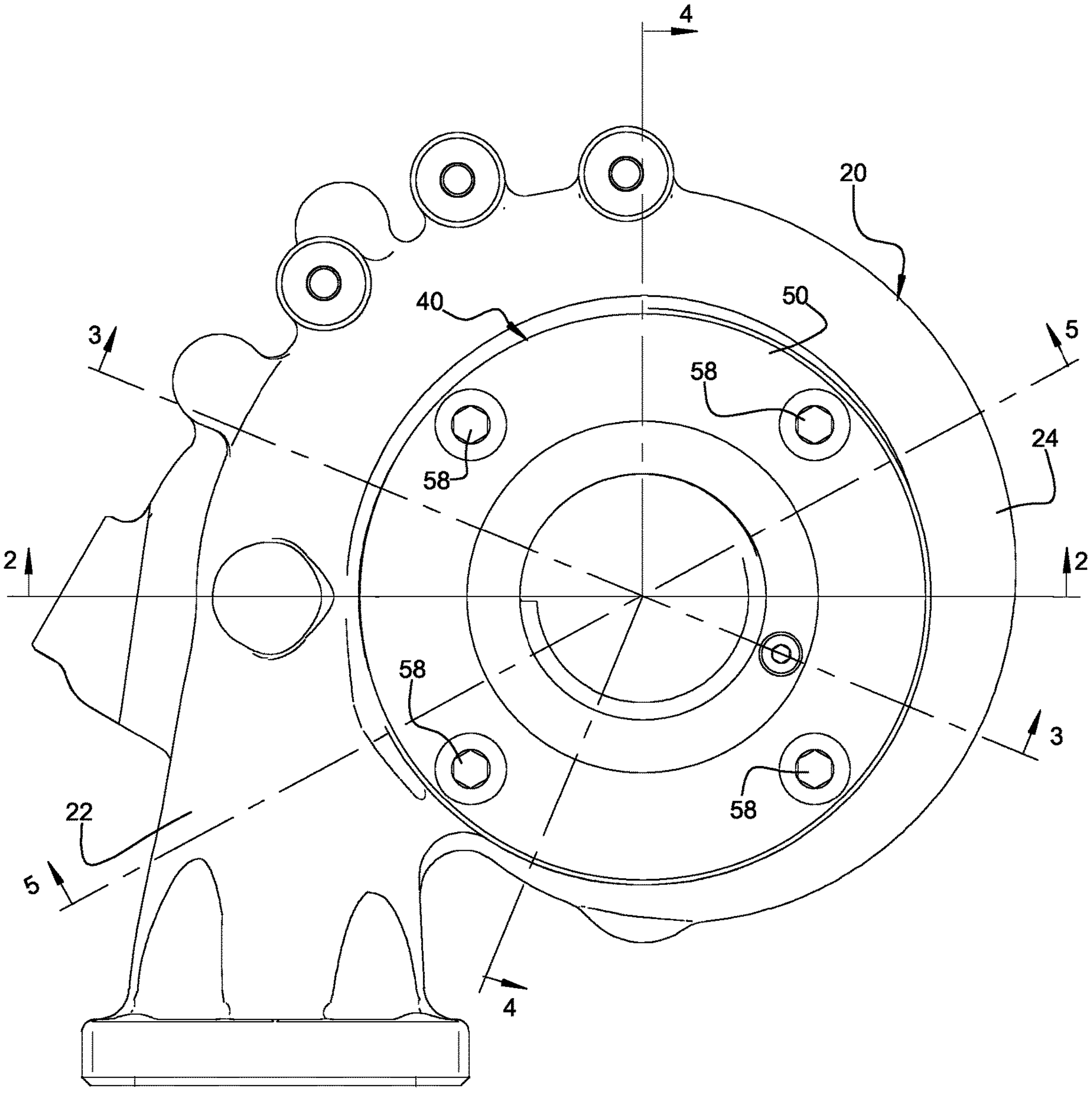
FIG. 1 is an axial end view of a turbine housing and fixture assembly in accordance with one embodiment of the invention.
Figure 2:
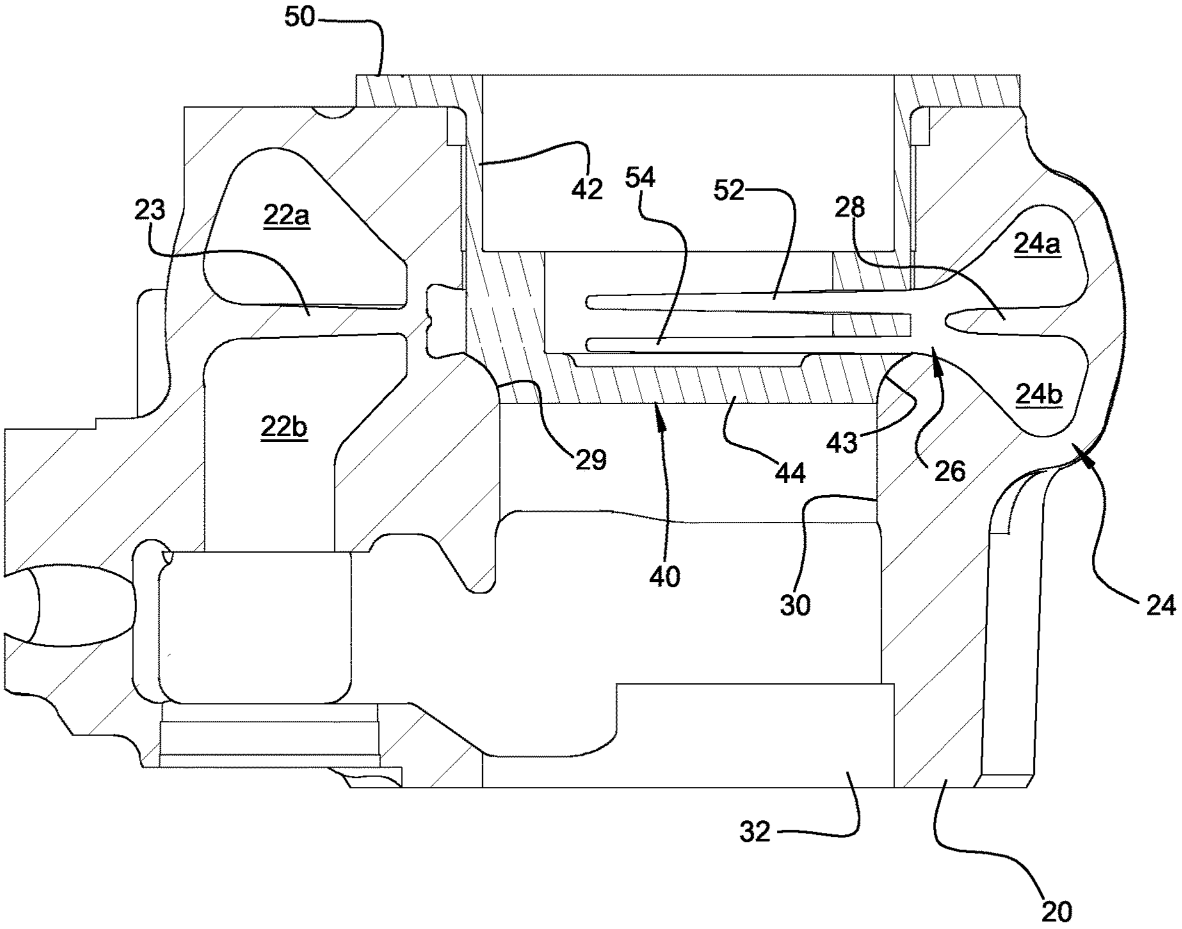
FIG. 2 is a cross-sectional view along line 2-2 in FIG. 1.
Figure 3:
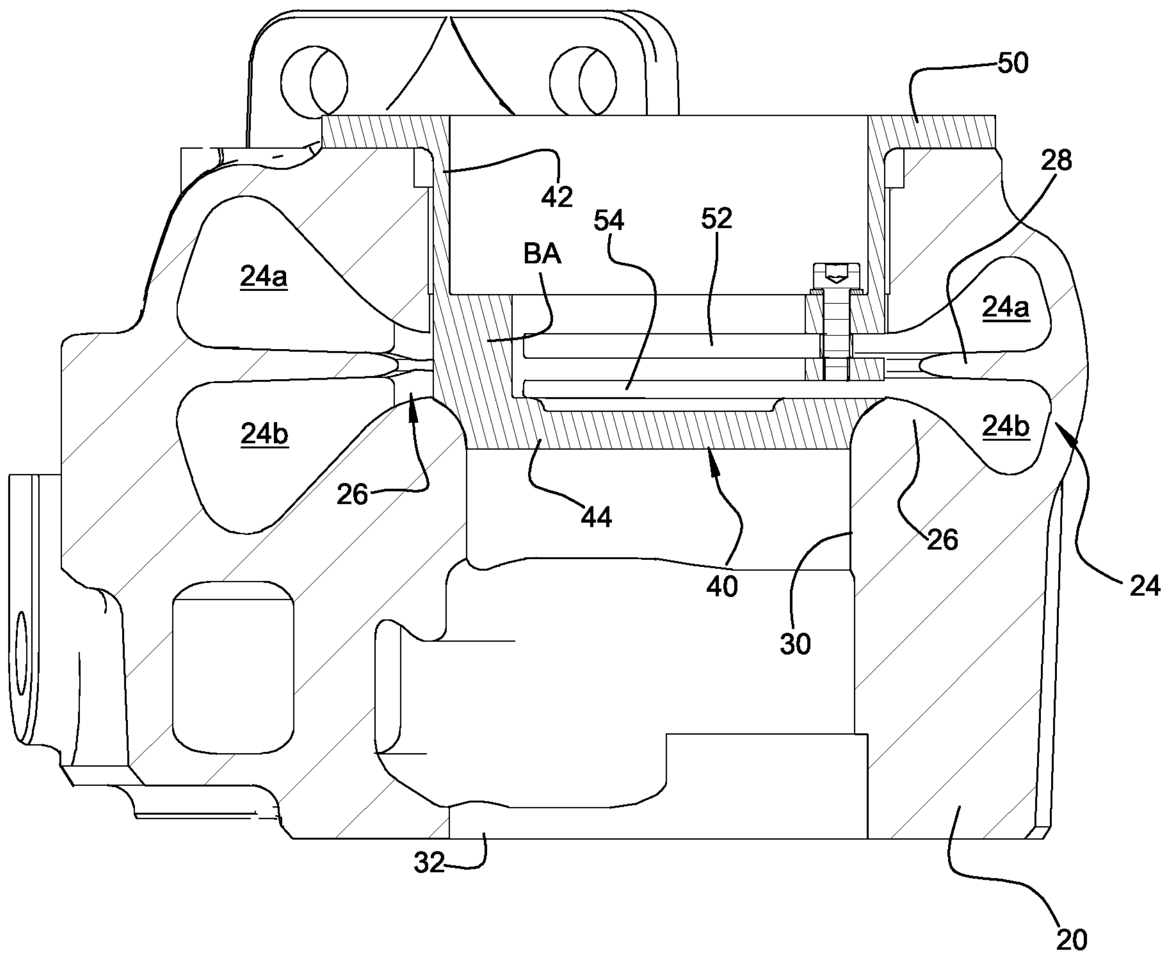
FIG. 3 is a cross-sectional view along line 3-3 in FIG. 1.
Figure 4:
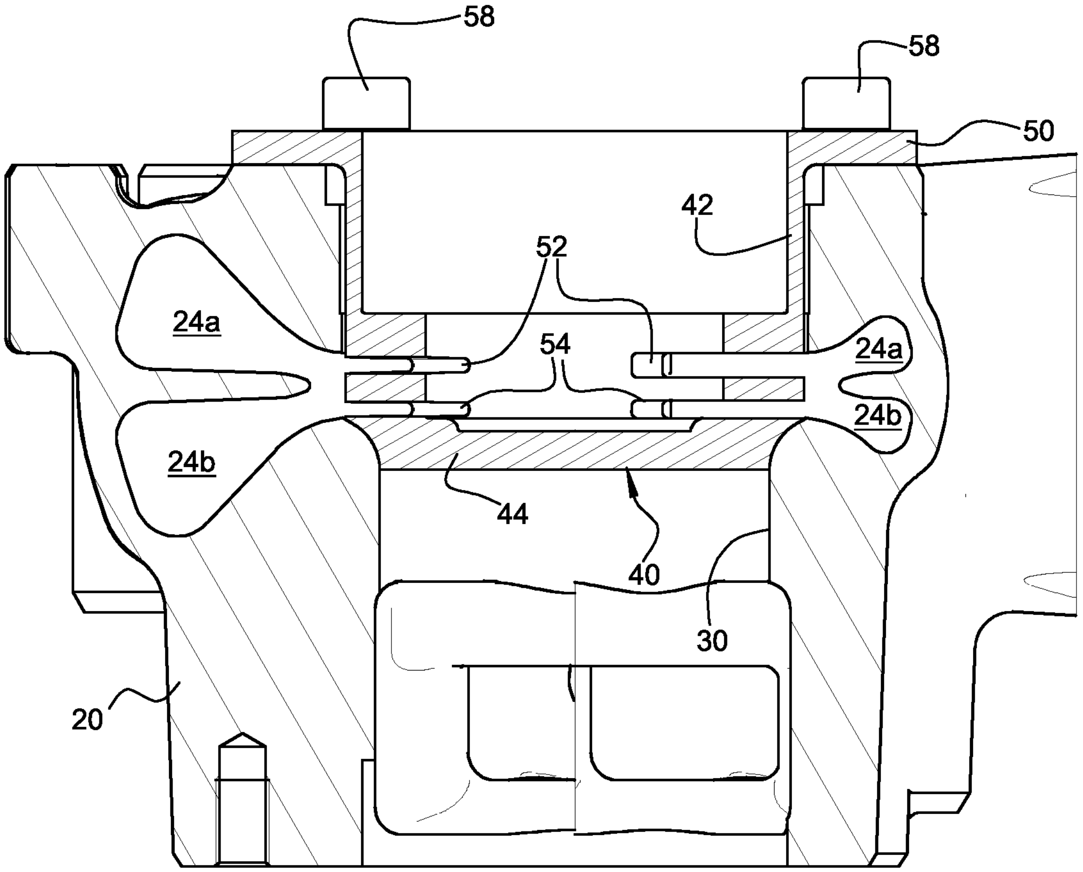
FIG. 4 is a cross-sectional view along line 4-4 in FIG. 1.
Figure 5:
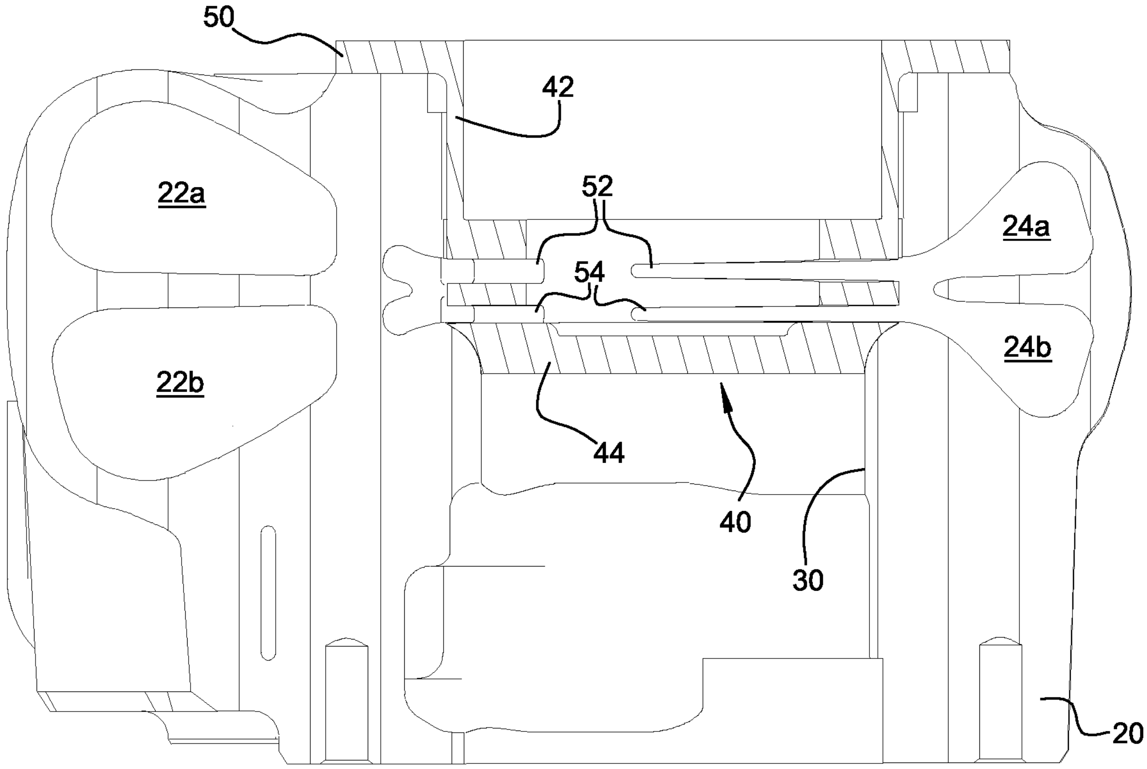
FIG. 5 is a cross-sectional view along line 5-5 in FIG. 1.

FIG. 1 depicts an assembly of a turbine housing 20 and a fixture 40 in accordance with an embodiment of the invention. FIGS. 2 through 5 are cross-sectional views through the assembly along the respective lines defined in FIG. 1. The turbine housing comprises an inlet pipe 22 partitioned by a center wall 23 into a first inlet conduit **22*a* and a second inlet conduit 22*b* for conducting two separate fluid streams into the turbine housing. The housing defines a volute 24 connected to the inlet pipe 22 and extending from the inlet pipe circumferentially about a center axis of the turbine housing, and an annular nozzle passage 26 connected to the volute and extending radially inwardly therefrom with respect to the center axis. In use in a turbocharger, exhaust gases from the engine enter the turbine housing through the inlet pipe 22 and flow throughout the volute 24, then proceed radially inwardly through the nozzle 26 to the turbine wheel. After passage through the turbine wheel, the gases exit through an axial bore 30 connected to the nozzle passage and extending axially to a discharge opening 32. The turbine housing further comprises a divider 28 disposed within the volute 24 so as to divide the volute into a first scroll 24*a* and a second scroll 24***b*. The first scroll 24*a* is connected to the first inlet conduit 22*a* and the second scroll 24*b* is connected to the second inlet conduit 22*b*. Thus, in use of the turbine housing in a turbocharger, the two separate streams of exhaust gas conducted by the inlet pipe 22 remain separated in the volute 24 until they merge within the nozzle passage 26, downstream of the radially inner edge of the divider 28. The turbine housing defines a shroud 29 configured to be in close proximity to radially outer tips of the blades of the turbine wheel (not shown), the shroud presenting a convex curvature in the radially inward direction.

Figure 6:
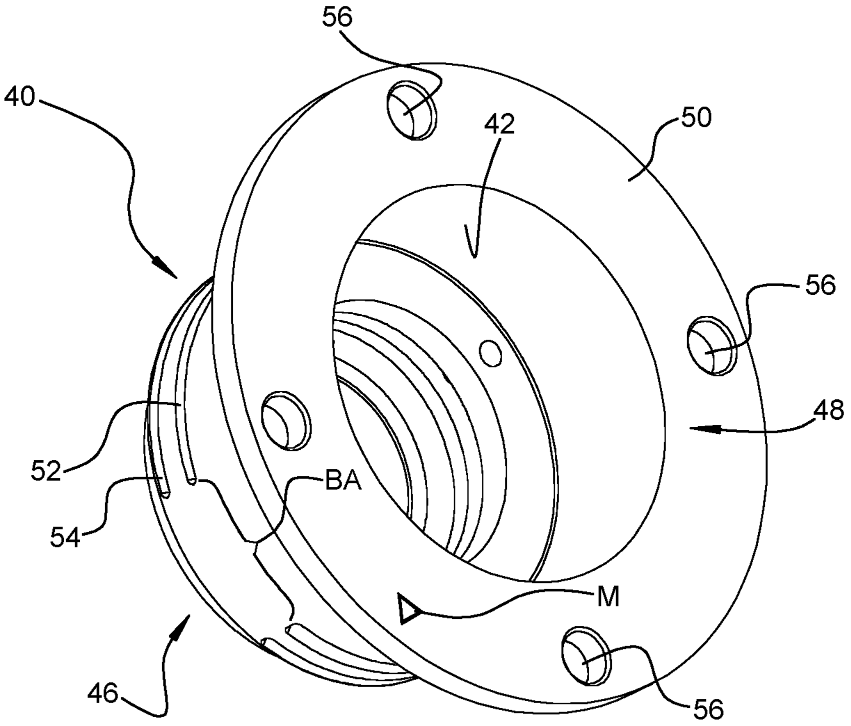
FIG. 6 is an isometric view of a fixture in accordance with an embodiment of the invention, viewed generally toward its open end.
Figure 7:
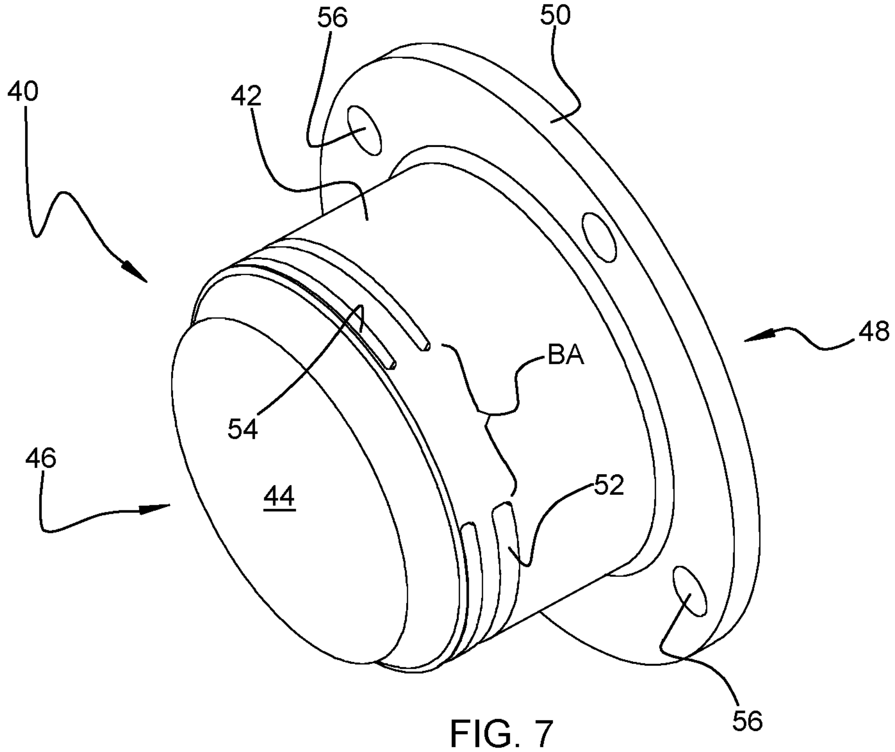
FIG. 7 is a further isometric view of the fixture, showing its closed end.
Figure 8:
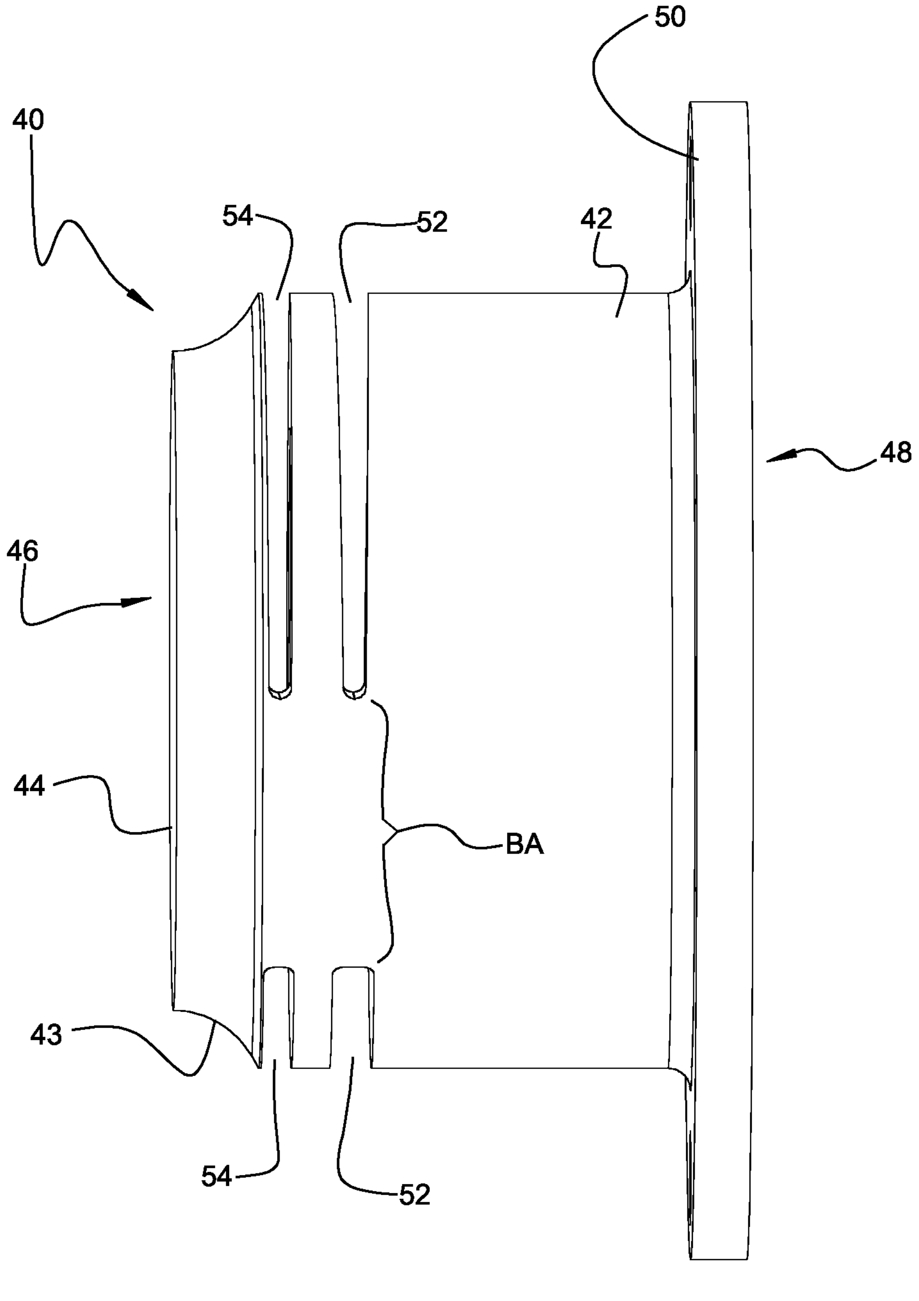
FIG. 8 is yet another isometric view of the fixture, viewed generally from the side.

With reference now to FIGS. 6 through 8, the fixture 40 comprises a tubular side wall 42 and an end wall 44 joined to one end thereof to form a cup comprising a closed end 46 and an open end 48. A mounting flange 50 is disposed at the open end of the cup, the mounting flange extending radially outwardly with respect to a longitudinal axis of the cup. The tubular side wall defines a first slot 52 and a second slot 54 each extending from a radially outer surface to a radially inner surface of the tubular side wall, the first and second slots being proximate the end wall and being axially spaced apart. The first and second slots are circumferentially coextensive and extend circumferentially over an angular sector occupying between 300° and 330° of a circumference of the tubular side wall such that there remains a slot-free blocking area BA occupying between 30° and 60° of the circumference. In the illustrated embodiment, the blocking area occupies 45° of the circumference.

With reference to FIGS. 1 through 5, the turbine housing 20 is depicted with the fixture 40 installed. The fixture is inserted, closed end first, into the axial bore of the turbine housing, from the side of the housing that connects with the center bearing housing of a turbocharger. A radially outer surface 43 (FIGS. 2 and 8) of the side wall 42 adjacent the end wall 44 defines a concave-outward curvature for engaging a convex contour defined by the turbine housing shroud 29. Holes 56 are defined in the flange 50 for receiving fasteners 58 to affix the fixture to the turbine housing to provide substantially gap-free engagement between the fixture surface 43 and the turbine shroud 29, thereby establishing the correct axial position of the fixture in which the slots 52 and 54 are located at axial positions that substantially coincide with the axial positions of the first and second scrolls 24*a* and 24*b*, respectively. In this position, the region of the side wall 42 located between the two slots is aligned with the divider 28 of the volute.

It is also of key importance that the fixture 40 be properly oriented in a rotational sense. More particularly, with reference to FIG. 7, the circumferential location of the start of the blocking area BA (denoted by the alignment marker M in FIG. 6) preferably should coincide with the end of the turbine housing tongue. The tongue is the juncture between the radially innermost wall of the inlet pipe 22 and the volute, where said innermost wall terminates. The fixture is configured such that during an AFM process in which the abrasive medium is fed through the inlet pipe and flows around the volute to exit through the nozzle into the axial bore and then out from the discharge opening, within the initial angular sector of the volute (generally occupying between 30° and 60° of the circumference; specifically, 45° in the illustrated embodiment), the blocking area prevents abrasive medium from immediately exiting the volute through the nozzle. Following the end of the blocking area, the two slots 52 and 54 begin as relatively narrow slots, and with increasing circumferential distance from the blocking area, the slots become increasingly wider (compare the lefthand side of FIG. 2 located at approximately 0°, with the righthand side of FIG. 3 located at approximately 90°). The widening of the slots continues up to approximately 180° (see righthand side of FIG. 2), where the slot axial widths reach their maximum values. Then, from 180° to 360°, the slot widths are constant with changing circumferential location. This progression of slots widths as shown in the illustrated embodiment is only an exemplary embodiment, and the invention is not limited to any particular evolution of slot widths, since the optimum evolution will generally depend on the specifics of the turbine housing configuration and other factors. In general, however, it will be advantageous for the slot widths to increase in the circumferential direction from the inlet pipe juncture with the volute.

It will be noted in the drawings that the slots 52 and 54 do not have the same axial widths. In general, the first slot 52 is wider than the second slot 54 in the illustrated embodiment. The invention, however, is not limited to such an arrangement, and in some cases the slots widths can be equal.

In AFM process trials using the fixture substantially as illustrated in the drawings, uniformity of honing of the inner surfaces of the volute about the circumference was substantially improved compared to the results obtained without using the fixture. Furthermore, erosion of the volute divider was significantly reduced with the fixture.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A process for treating a meridionally divided turbine housing, the turbine housing comprising an inlet pipe partitioned by a center wall into a first inlet conduit and a second inlet conduit for conducting two separate fluid streams into the turbine housing, a volute connected to the inlet pipe and extending from the inlet pipe circumferentially about a center axis of the turbine housing, an annular nozzle passage connected to the volute and extending radially inwardly therefrom with respect to the center axis, and an axial bore connected to the nozzle passage and extending axially to a discharge opening, the turbine housing further comprising a divider disposed within the volute so as to divide the volute into a first scroll and a second scroll, the first scroll being connected to the first inlet conduit and the second scroll being connected to the second inlet conduit, the process comprising the steps of:

causing a medium comprising a pressurized abrasive fluid to flow in one direction between the inlet pipe and the discharge opening via the nozzle disposed therebetween;

blocking a flow of the medium through the nozzle in a first angular sector that extends partially about a circumference of the turbine housing, the first angular sector being adjacent the inlet pipe, wherein a geometry of a fixture is configured to substantially prevent abrasive flow through said portion of the nozzle corresponding to the first angular sector;

throttling the flow of the medium through the nozzle in a second angular sector that begins at a point adjacent the first angular sector and extends about a remainder of the circumference, wherein the throttling step comprises producing a circumferential gradient of flow restriction within the second angular sector such that the flow is restricted to a greater degree in a first portion of the second angular sector and is restricted to a lesser degree in a second portion thereof, and wherein the blocking and throttling steps are accomplished exclusively by the geometry of the fixture, which is installed in the axial bore or the turbine housing, the fixture comprising circumferentially non-uniform features configured to produce the blocking and throttling behavior as defined above, and wherein the fixture comprises a tubular side wall having a pair of axially spaced, circumferentially coextensive slots defining the throttling behavior.

2. The process of claim 1, wherein the first portion of the second angular sector is adjacent the first angular sector.

3. The process of claim 2, wherein the first angular sector occupies between 30° and 60° of the circumference.

4. The process of claim 2, wherein the throttling step comprises producing a gradient of flow restriction within the first portion of the second angular sector with increasing circumferential distance from the first angular sector.

5. The process of claim 4, wherein throttling of the flow within the second portion of the second angular sector is uniform over the second portion, and wherein the fixture geometry produces the throttling.

6. The process of claim 1, wherein an axial width of each slot increases progressively in a circumferential direction over a first portion of the second angular sector and is uniform over a second portion thereof.

7. The process of claim 6, wherein the throttling behavior is defined by first and second axially spaced slots in the fixture, wherein the first and second slots are respectively aligned with the first and second scrolls of the turbine housing.

8. The process of claim 6, wherein the axial width of each slot begins to increase immediately adjacent an end of a blocking area.

9. The process of claim 6, wherein the axial width of each slot reaches a maximum at a circumferential location approximately opposite a blocking area.

10. The process of claim 6, wherein the axial width of each slot remains substantially constant over a remaining 180° of the second angular sector.

11. The process of claim 1, wherein the fixture comprises a surface that mates with a convex contour of a turbine housing shroud to establish a substantially gap-free engagement.

12. The process of claim 1, wherein the fixture includes an alignment marker, and the fixture is oriented during installation such that a blocking area begins at an end of a tongue defined between the inlet pipe and the volute.

13. The process of claim 1, wherein the slots extend circumferentially over an angular sector occupying between 300° and 330° of a circumference of the fixture.

14. The process of claim 1, wherein a blocking area of the fixture occupies between 30° and 60° of the circumference.

15. The process of claim 1, wherein the first slot is wider than the second slot.

16. The process of claim 1, wherein the first and second slots have equal axial slot widths.

17. The process of claim 1, wherein the fixture is inserted into the axial bore in a direction opposite to the direction of abrasive flow.

* * * * *